United States Patent [19]

Moscovici

[11] Patent Number: 4,679,133
[45] Date of Patent: Jul. 7, 1987

[54] SYSTEM FOR ALLEVIATING HARMONIC DISTORTION

[75] Inventor: Poldi Moscovici, Woodcliff Lake, N.J.

[73] Assignee: Superior Manufacturing & Instrument Corporation, Maspeth, N.Y.

[21] Appl. No.: 870,378

[22] Filed: Jun. 4, 1986

[51] Int. Cl.$^4$ ............................................. H02M 1/12
[52] U.S. Cl. ........................................ 363/46; 363/97
[58] Field of Search ..................... 363/46, 97, 39, 44, 363/45, 74

[56] References Cited

U.S. PATENT DOCUMENTS 4,599,504 7/1986 Ito ....................................... 363/46 X
4,607,324 8/1986 Gibbons ............................ 363/46 X Primary Examiner—Patrick R. Salce
Assistant Examiner—Anita M. Ault
Attorney, Agent, or Firm—George H. Gerstman

[57] ABSTRACT

A system is provided for alleviating harmonic distortion in a power supply having an AC input, a full wave rectifier and filter capacitors. The rectified voltage is chopped at a frequency that is higher than the frequency of the original AC waveform. The higher frequency cycle is provided by timing means coupled to the gate of a FET. The chopped and rectified voltage is stored in an inductor device during one portion of the higher frequency cycle and the energy from the inductor device is transferred to the filter capacitors during another portion of the higher frequency cycle. A reverse protection diode, and a capacitor for delivering high frequency energy to the FET are connected across the output of the full wave rectifier.

15 Claims, 5 Drawing Figures

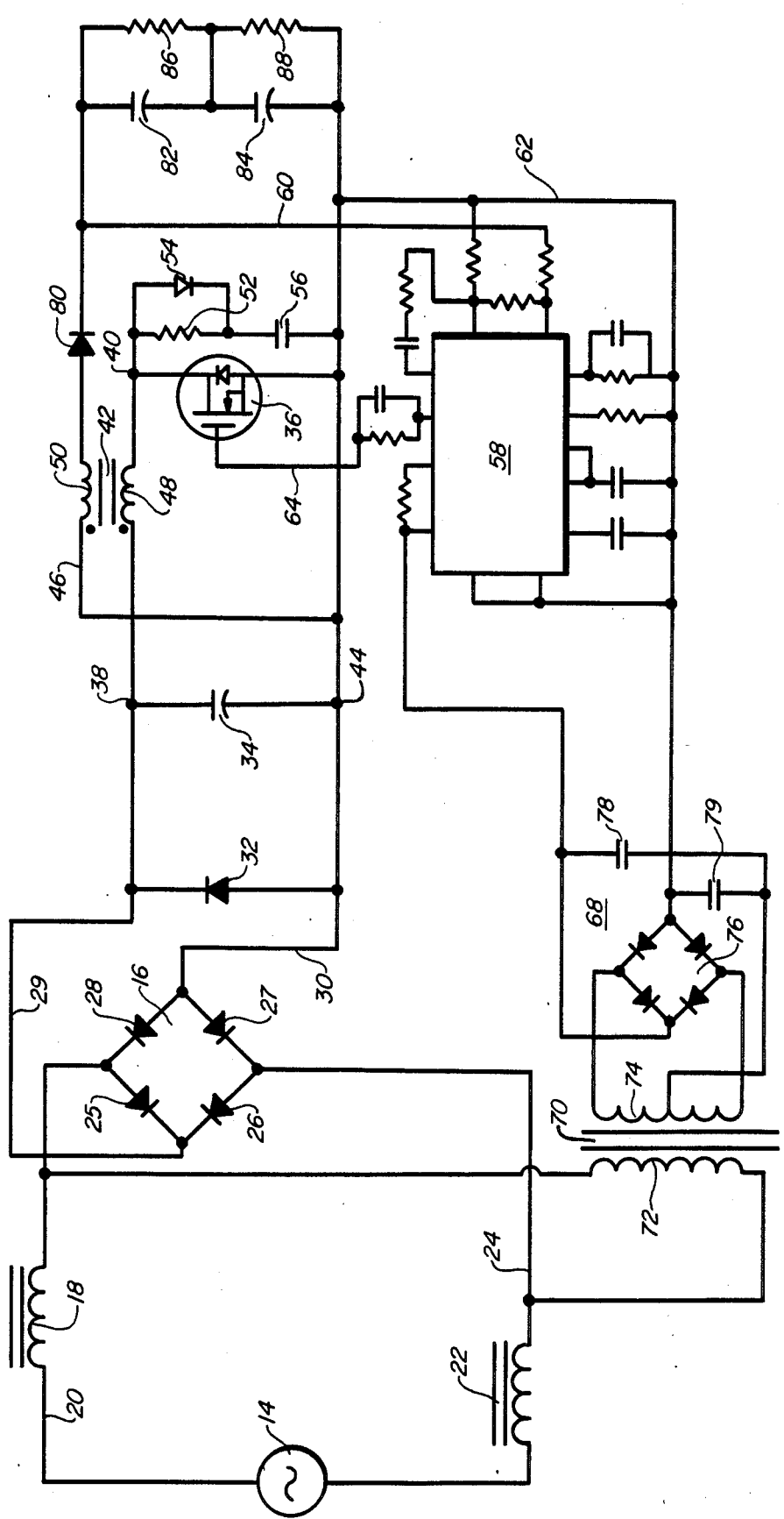

SYSTEM FOR ALLEVIATING HARMONIC DISTORTION

FIELD OF THE INVENTION

The present invention concerns a novel system for alleviating harmonic distortion in a power supply.

BACKGROUND OF THE INVENTION

Certain governmental specifications, for example, Navy Standard 1399, require a power supply in which the third harmonic is within three percent of the first harmonic. The sum of the total harmonics are required to be within less than five percent of the first harmonic.

Ideally, the current would be in perfect phase with the voltage to provide a power factor of 1. As the current becomes more out of phase with the voltage, the power factor lowers.

Referring to FIG. 1 of the drawings, for example, the voltage sinusoidal wave 12 is input to a switching power supply. As a result of the large input capacitance seen by the input line into the power supply, the current waveform 10 is significantly out of phase with the voltage waveform 12. Current waveform 10 in effect represents the time that current is being drawn from the input other than for the purpose of charging the filter capacitors.

Therefore, it is an object of the present invention to reduce harmonic distortion so that the current waveform will be substantially in phase with the sinusoidal voltage waveform.

Other objects and advantages of the present invention will become apparent as the description proceeds.

SUMMARY OF THE INVENTION

In accordance with the present invention, a power supply is provided having an AC input, a full wave rectifier and a filter capacitor. The system for alleviating harmonic distortion includes means for chopping the rectified voltage at a frequency that is higher than the frequency of the original AC waveform. Timing means are provided for providing the higher frequency cycle. An inductor device is provided for storing the chopped and rectified voltage during one portion of the higher frequency cycle. Means are provided for transferring stored energy from the inductor device to the filter capacitor during another portion of the higher frequency cycle.

In the illustrative embodiment, the chopping means comprises a FET the gate of which is coupled to the timing means. The inductor device comprises a transformer having a pair of windings, with the chopped and rectified voltage being stored in one of the windings during one portion of the cycle and stored energy being transferred via the other winding during another portion of the cycle. The timing means comprises a pulse width modulator for providing rectangular waves to the gate of the FET.

A more detailed explanation of the invention is provided in the following description and claims, and is illustrated in the accompanying drawings.

BRIEF DESCRIPTION OF THE DRAWINGS

FIG. 1 illustrates the out of phase current waveform seen at the input of a prior art power supply;

FIG. 2 is a schematic circuit diagram of a system for alleviating harmonic distortion, constructed in accordance with the principles of the present invention;

FIG. 5 is an illustration of the current waveform and the voltage waveform of the power supply of the present invention, as seen at its input lines.

DETAILED DESCRIPTION OF THE ILLUSTRATIVE EMBODIMENT

Figure 3:
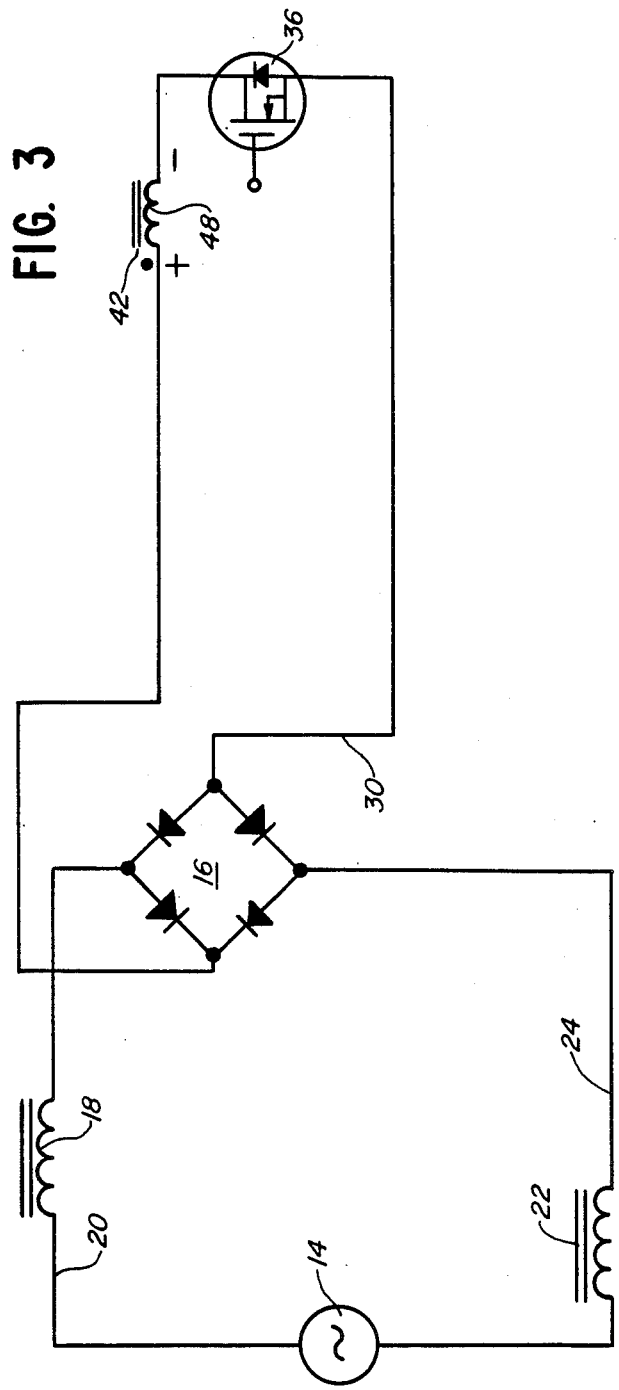
FIG. 3 is a schematic representation of the circuit of FIG. 1 during the portion of the timing cycle when the FET of FIG. 2 is conducting.

As stated above, referring to FIG. 1, in prior art power supplies the current waveform 10 is out of phase with the sinusoidal voltage waveform 12 as seen at the input line into the power supply.

The present invention alleviates such harmonic distortion. Referring to FIG. 2, a source of alternating current, 14, for example, 60 cycle AC, is fed to a conventional full wave rectifier 16 through a choke 18 on line 20 and a choke 22 on line 24. Full wave rectifier 16 includes diodes 25, 26, 27 and 28, as illustrated.

The rectified AC is fed via lines 29, 30 across a reverse protection diode 32 and across capacitor 34 which delivers high frequency energy for a FET 36 to turn on and off as will be described. One side 38 of capacitor 34 is connected to one side 40 of transformer 42 and the oppsite side 44 of capacitor 34 is connected to the other side 46 of transformer 42.

Transformer 42 comprises a first winding 48 and a second winding 50, with first winding 48 connected to the drain of FET 36. A clamp protection circuit comprising resistor 52, diode 54 and capacitor 56 is connected across the drain/source circuit of FET 36.

The gate of FET 36 is controlled by a timing circuit 58 comprising a pulse width modulator that provides a rectangular wave such as a square wave having a 50/50 duty cycle. The voltage level is controlled by feedback lines 60 and 62 which are fed to an error amplifier and comparator. The feedback signal from lines 60 and 62 operate the error amplifier/comparator to provide a pulse width modulated signal from timing means 58 so that the duty cycle on line 64 to the gate of FET 36 is modulated in accordance with the feedback signal from lines 60 and 62.

Timing means 58 is provided with a suitable operating voltage by means of an auxiliary power supply 68. Power supply 68 comprises a transformer 70, the primary 72 of which is supplied by AC source 14 and the secondary 74 is connected to a full wave rectifier 76, the output of which is connected to filter capacitors 78, 79.

The winding 50 of transformer 42 is connected via diode 80 to filter capacitors 82, 84. The load 86, 88 is shown connected across capacitors 82 and 84.

In the operation of the system, assume that there is a 50/50 duty cycle square wave on line 64. The frequency of the square wave is much higher than the original 60 cycle AC. For example, timing means 58 preferably provides a square wave at a frequency of 50 kilohertz to chop the rectified AC voltage along the complete conduction cycle from 0° to 180° for a half wave.

During the positive portion of the duty cycle, FET 36 will be conductive. When it is conductive, the energy is stored in transformer 42 and diode 80 is back biased so it does not conduct. During the negative portion of the square wave on line 64, the FET 36 is nonconducting and transformer 42 changes in polarity, thereby transferring the energy from the transformer via diode 80 to storage capacitors 82, 84 and load 86, 88. Thus during the "on" time of FET 36, the current is being drawn and stored in transformer 42 while during the "off" time of FET 36, the current is being drawn in the opposite direction and is being stored by the filter capacitors 82, 84.

Figure 4:
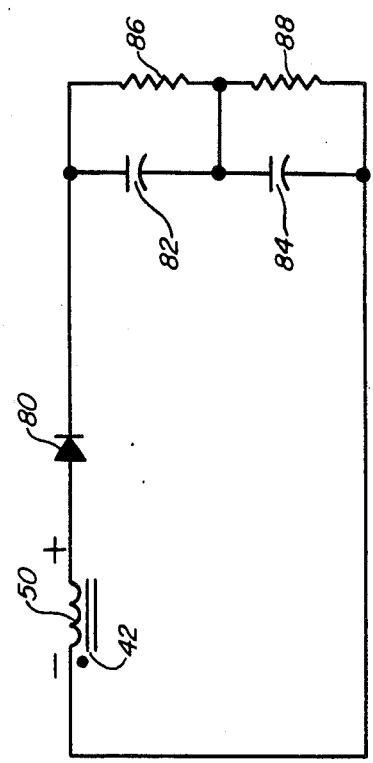
FIG. 4 is a schematic representation of the circuit of FIG. 2 during the portion of the timing cycle in which the FET of FIG. 2 is non-conducting.

In other words, during the "on" time of FET 36, energy is being transferred from chokes 18, 22 and full wave rectifier 16 through FET 36 to form a closed loop through FET 36 thereby storing the energy in transformer 42. FIG. 3 represents the operation of the system when the FET is not conducting. When FEt 36 is off, transformer 42 becomes the energy supply and the energy that is stored in transformer 42 is fed to the load via diode 80 and also diode 23. FIG. 4 represents the operation of the system when FET 36 is not conducting.

Although a FET 36 is illustrated, it is to be understood that FET 36 could be another type of switch that is operating to close the circuit to allow conduction in transformer 42 in one direction and then open the switch to allow conduction in the other direction so that it will flow via diode 80 to a storage capacitor and load.

FIG. 5 shows how the current waveform 10a, viewed at the input to the power supply of FIG. 2, is effectively in phase with the voltage waveform 12.

Although an illustrative embodiment of the invention has been shown and described, it is to be understood that various modifications and substitutions may be made by those skilled in the art without departing from the novel spirit and scope of the present invention.

What is claimed is:

1. In a power supply having an AC input waveform with a first frequency, a full wave rectifier having an output for providing rectified voltage, and a filter capacitor, a system for alleviating harmonic distortion to fill in gaps between voltage and current, which comprises:
   means for chopping the rectified voltage at a frequency cycle that is higher than the first frequency and with the higher frequency cycle having a positive portion and a negative portion;
   timing means for providing said higher frequency cycle;
   an inductor device for storing the chopped and rectified voltage during one of the positive and negative portions of the higher frequency cycle; and
   means for transferring stored energy from the inductor device to the filter capacitor during the other of the positive and negative portions of said higher frequency cycle, whereby the gaps between voltage and current are substantially filled in.

2. A power supply as described in claim 1, said chopping means comprising a FET the gate of which is coupled to said timing means.

3. A power supply as described in claim 1, said inductor device comprising a transformer having a pair of windings, with the chopped and rectified voltage being stored in one of the windings during said one portion of the cycle and stored energy being transferred via the other winding during said another portion of the cycle.

4. A power supply as described in claim 3, said other winding including a diode forward biased in the direction of the filter capacitor.

5. A power supply as described in claim 1, wherein the positive portion of the cycle and the negative portion of the cycle are equal in time.

6. A power supply as described in claim 1, said chopping means comprising a switch having a control electrode, and said timing means comprising a rectangular wave generator coupled to said control electrode.

7. A power supply as described in claim 5, said switch comprising a FET having a gate and said control electrode comprising the gate of said FET.

8. A power supply as described in claim 7, said rectangular wave generator comprising a pulse width modulator for providing square waves having a 50/50 duty cycle.

9. A power supply as described in claim 1, in which the full wave rectifier has an output and further including a reverse protection diode connected across the output of the full wave rectifier.

10. A power supply as described in claim 1, and further including a capacitor connected across the output of the full wave rectifier for delivering high frequency energy to said chopping means.

11. In a power supply having an AC input waveform with a first frequency, a full wave rectifier having an output for providing rectified voltage, and a filter capacitor, a system for alleviating harmonic distortion to fill in gaps between voltage and current, which comprises:
   means for chopping the rectified voltage at a frequency cycle that is higher than the first frequency and with the higher frequency cycle having a positive portion and a negative portion; said chopping means comprising a switch having a control electrode;
   timing means for providing said higher frequency cycle, said timing means comprising a rectangular wave generator coupled to said control electrode;
   an inductor device for storing the chopped and rectified voltage during one of the positive and negative portions of the higher frequency cycle;
   means for transferring stored energy from said inductor device to said filter capacitor during the other of the positive and negative portions of said higher frequency cycle, whereby the gaps between voltage and current are substantially filled in;
   said inductor device comprising a transformer having a pair of windings, with the chopped and rectified voltage being stored in one of the windings during said one portion of the cycle and stored energy being transferred via the other winding during said other portion of the cycle; and
   said other winding including a diode forward biased in the direction of the filter capacitor.

12. In a power supply having an AC input waveform with a first frequency, a full wave rectifier having an output for providing rectified voltage, and a filter capacitor, a system for alleviating harmonic distortion to fill in gaps between voltage and current, which comprises:
   means for chopping the rectified voltage at a frequency cycle that is higher than the first frequency and with the higher frequency cycle having a positive portion and a negative portion; said chopping means comprising a FET having a gate;
   timing means for providing said high frequency cycle;
   means coupling said timing means to said gate;

an inductor device for storing the chopped and rectified voltage during one of the positive and negative portions of the higher frequency cycle;

means for transferring stored energy from said inductor device to said filter capacitor during the other of the positive and negative portions of said higher frequency cycle;

said inductor device comprising a transformer having a pair of windings, with the chopped and rectified voltage being stored in one of the windings during said one portion of the cycle and stored energy being transferred via the other winding during said other portion of the cycle;

said timing means comprising a pulse width modulator for providing rectangular waves having a variable duty cycle;

said other winding including a diode forward biased in the direction of the filter capacitor;

a reverse protection diode connected across the output of the full wave rectifier; and a capacitor connected across the output of the full wave rectifier for delivering high frequency energy to said chopping means.

13. A power supply as described in claim 12, in which said filter capacitor comprises a pair of filter capacitors and including load means coupled in parallel thereto.

14. A method for alleviating harmonic distortion to fill in gaps between voltage and current in a power supply having an AC input waveform with a first frequency, a full wave rectifier for providing rectified voltage, and a filter capacitor, comprising the steps of:

providing a higher frequency cycle timing waveform with the higher frequency cycle having a positive portion and a negative portion;

chopping the rectified voltage at said high frequency;

storing the chopped and rectified voltage during one of the positive and negative portions of the higher frequency cycle; and transferring stored energy to the filter capacitor during the other of the positive and negative portions of the higher frequency, whereby the gaps between voltage and current are substantially filled in.

15. A method as described in claim 14, in which said chopping step comprises the step of providing said higher frequency cycle timing waveform to the gate of a FET.

* * * * *